(12) United States Patent
Kasson et al.

(10) Patent No.: US 11,882,418 B2
(45) Date of Patent: Jan. 23, 2024

(54) AUDIO SWITCHING SYSTEM AND DEVICE

(71) Applicant: MA Federal, Inc., Reston, VA (US)

(72) Inventors: Greg Kasson, Clearwater, FL (US); Mathew Denault, Tampa, FL (US)

(73) Assignee: MA Federal, Inc., Reston, VA (US)

( * ) Notice: Subject to any disclaimer, the term of this patent is extended or adjusted under 35 U.S.C. 154(b) by 42 days.

(21) Appl. No.: 17/831,929

(22) Filed: Jun. 3, 2022

(65) Prior Publication Data

US 2022/0394385 A1    Dec. 8, 2022

Related U.S. Application Data

(60) Provisional application No. 63/196,272, filed on Jun. 3, 2021.

(51) Int. Cl.
| | | |
|---|---|---|
| H04R 3/12 | (2006.01) | |
| H04R 5/04 | (2006.01) | |
| H04L 67/75 | (2022.01) | |
| H04R 5/033 | (2006.01) | |

(52) U.S. Cl.
CPC .............. *H04R 3/12* (2013.01); *H04L 67/75* (2022.05); *H04R 5/033* (2013.01); *H04R 5/04* (2013.01); *H04R 2420/01* (2013.01); *H04R 2420/07* (2013.01)

(58) Field of Classification Search
None
See application file for complete search history.

(56) References Cited

U.S. PATENT DOCUMENTS

| | | |
|---|---|---|
| 3,059,184 A | 10/1962 | Germain |
| 4,232,390 A | 11/1980 | McEvilly |
| 6,975,178 B1 | 12/2005 | Kessler et al. |
| 7,227,755 B1 | 6/2007 | Arnold et al. |
| 7,551,938 B1 | 6/2009 | Stein |
| 9,301,051 B2 | 3/2016 | LaBosco et al. |
| 9,467,780 B2 * | 10/2016 | Kelly ................. H04R 5/04 |
| 9,871,605 B2 | 1/2018 | Christian |
| 10,970,034 B2 | 4/2021 | Millington |

(Continued)

FOREIGN PATENT DOCUMENTS

| | | |
|---|---|---|
| CN | 203301573 U | 11/2013 |
| CN | 108882116 A | 11/2018 |

(Continued)

OTHER PUBLICATIONS

International Search Authority, International Search Report and Written Opinion for International Patent Application No. PCT/US22/32178, dated Sep. 29, 2022.

*Primary Examiner* — Paul W Huber
(74) *Attorney, Agent, or Firm* — Williams Mullen; Thomas F. Bergert

(57) ABSTRACT

Embodiments of an audio distribution module and system provide a compact and rugged audio switching device including a radio control unit in communication with an operator control panel. In various embodiments, an audio switching fabric is included with audio relays for directing the transmission and receipt of audio content between a headset in communication with the operator control panel and one or more radios in communication with the radio control unit, facilitating transmission and receipt of audio communications between the radio(s) and the headset.

12 Claims, 11 Drawing Sheets

(56) References Cited

U.S. PATENT DOCUMENTS

| | | | |
|---|---|---|---|
| 2008/0134102 A1* | 6/2008 | Movold | G06F 3/017 |
| | | | 715/863 |
| 2010/0178958 A1 | 7/2010 | Su | |
| 2011/0026432 A1 | 2/2011 | Gruber et al. | |
| 2012/0032945 A1 | 2/2012 | Dare et al. | |
| 2016/0353204 A1 | 12/2016 | Kessner | |
| 2018/0289095 A1 | 10/2018 | Catterson et al. | |
| 2022/0256273 A1* | 8/2022 | Degraye | H04R 5/0335 |

FOREIGN PATENT DOCUMENTS

| | | |
|---|---|---|
| DE | 19827995 C1 | 10/1999 |
| KR | 101651598 B1 | 8/2016 |

\* cited by examiner

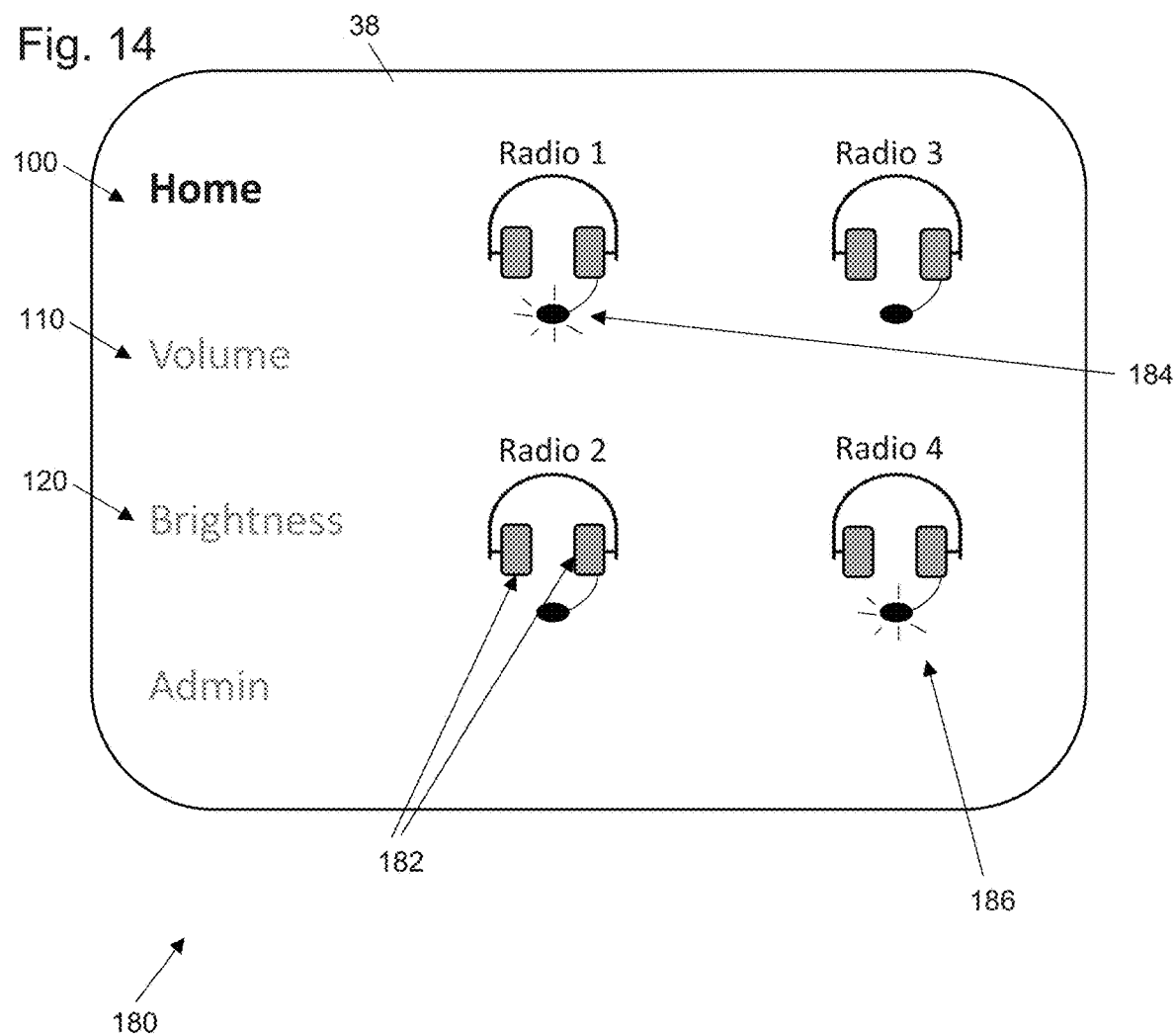

AUDIO SWITCHING SYSTEM AND DEVICE

CROSS-REFERENCE TO RELATED APPLICATIONS

The present application claims the priority benefit of U.S. Provisional Patent Application Ser. No. 63/196,272, filed Jun. 3, 2021, the disclosure of which is incorporated by reference herein in its entirety.

FIELD OF THE INVENTION

The present disclosure relates to audio communications, and more particularly to a portable and rugged device for audio switching enabling receipt and transmission of audio signals from a single headset.

BACKGROUND AND SUMMARY

Audio switching devices are designed to permit communications lines between multiple devices to be connected and disconnected according to the user's desired operation. Current audio switching devices lack versatility and portability of operations when managing multiple field radio units.

Embodiments of the audio distribution module (ADM) of the present disclosure provide a compact and rugged audio switching device that allows a user to transmit and receive audio between one to multiple portable radios and a single, dual-ear/dual-Push-to-Talk (PTT) headset. The ADM of the present disclosure can allow a single user to monitor, receive audio from, and transmit audio to, multiple radios from a single headset. The compact, rugged design of the ADM as disclosed herein permits utility in tactical military communications applications as well as other applications. Embodiments of the ADM as disclosed herein employ a radio control unit physically separated from an operator control panel.

BRIEF DESCRIPTION OF THE DRAWINGS

FIGS. 13 and 14 are additional schematic views of a Home screen display in accordance with embodiments of the present disclosure.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to an amplifier may encompass one or more amplifiers, reference to a radio may encompass one or more radios, reference to a microcontroller may encompass one or more microcontrollers and so forth.

As shown in FIGS. 1 through 14, embodiments of the present disclosure provide an audio distribution system 10 including an audio distribution module (ADM) 12 having a radio control unit (RCU) 14 and an operator control panel (OCP) 16. The ADM 12 can accept wide-ranging DC power as its input, then conditions, converts and distributes this input power to components in both the RCU 14 and the OCP 16. This wide range allows the ADM 12 to employ power from both commercial and military vehicles' native power systems. In various embodiments, the housings or casings 15 for the RCU 14 and OCP 16 are metal enclosures which can be finished in flat black paint, for example. The housings and their finish are of suitable material and design to protect the assemblies and components comprising the ADM 12 from the environmental effects of various operating environments including military operating environments. It will be appreciated that the RCU 14 and OCP 16 are distinct physical units that can be physically separated from one another so as to facilitate communications, space utilization efficiencies and overall operations as described herein.

Figure 1:
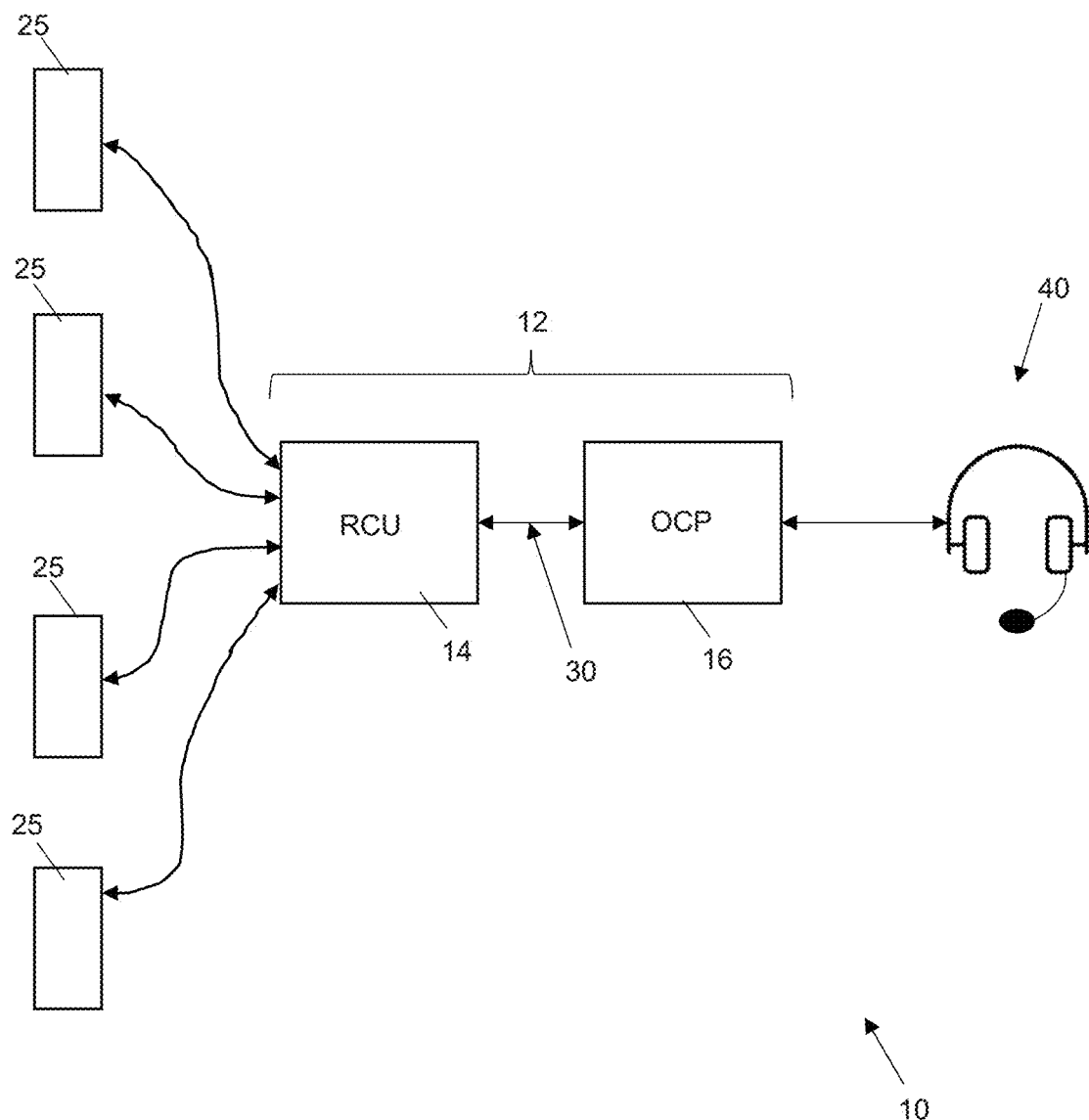
FIG. 1 is a schematic diagram of an embodiment of the ADM in accordance with embodiments of the present disclosure.
Figure 2:
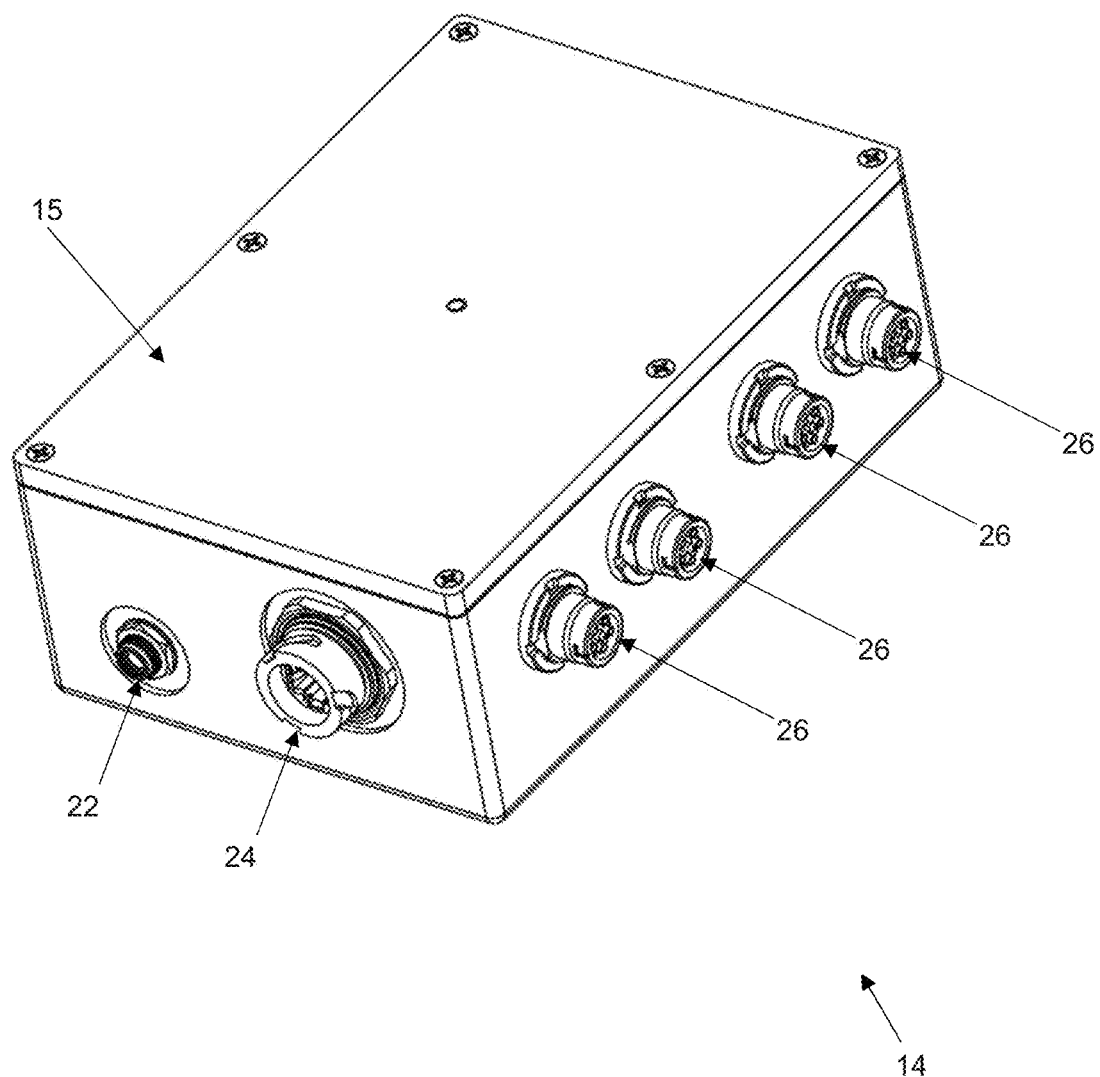
FIG. 2 is a perspective view of an embodiment of a radio control unit portion of an ADM in accordance with embodiments of the present disclosure.
Figure 9:
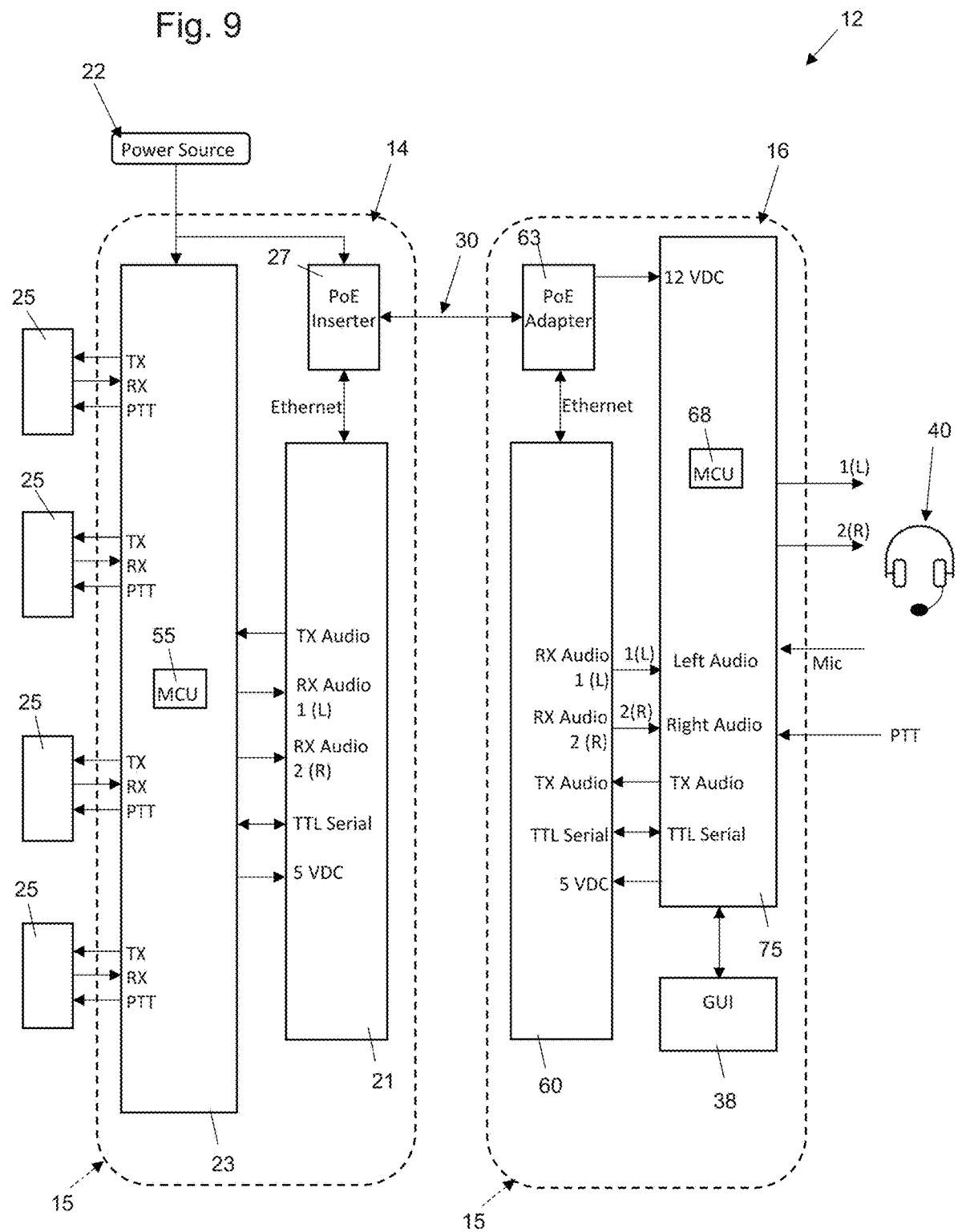
FIG. 9 is an exemplary signal flow diagram for an ADM in accordance with embodiments of the present disclosure.

As shown in FIGS. 1, 2 and 9, a DC system input power plug 22 resides in the RCU 14, and power routes through the RCU 14 to the OCP 16 via Power-over-Ethernet (PoE) 30. The PoE connector 24 on the RCU 14 can connect to a PoE connector 34 on the OCP 16. Distributing power via PoE eliminates traditional cabling infrastructure required to employ the ADM 12. It is also compliant with the IEEE 802.3af standard for PoE, allowing the ADM 12 to operate over traditional networking infrastructure. This allows the potential application environment of the ADM 12 to include on-the-move vehicles as well as command posts and combat operations centers. It will be appreciated that the IEEE 802.3af-compliant interconnect promotes populating the OCP 16 with the minimal mass of electronics needed to interface to the headset, while offering a user interface to the operator. In an on-the-move vehicular-mounted scenario, the operator of the ADM 12 is seated in a volume-constricted portion of the vehicle. The same is often true for command post or combat operations center scenarios, where desktop space around the operator is often limited. The bulk of the ADM mass is then relegated to the RCU 14, which mounts in less volume-constricted locations of the vehicle, or of the command post or combat operations center. This allows the ADM 12 to more efficiently integrate into existing combat radio operations spaces according to embodiments of the present disclosure.

Figure 5:
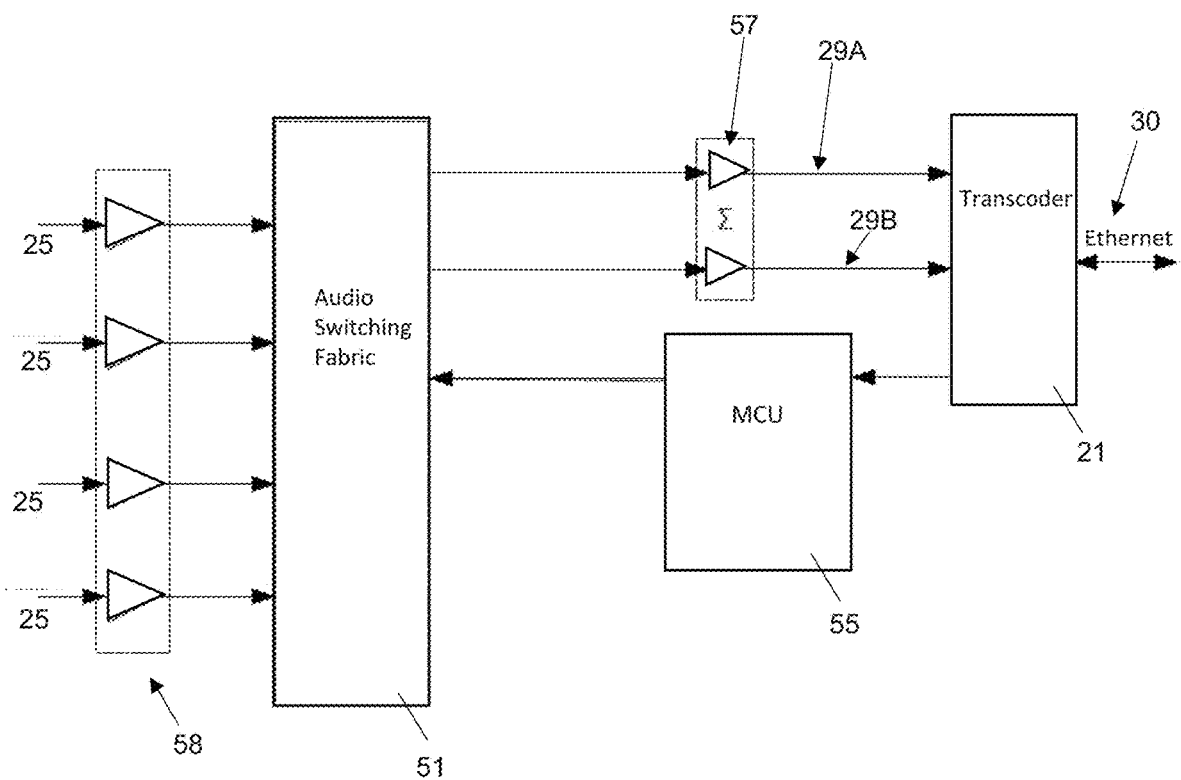
FIG. 5 shows an exemplary diagram of receive audio circuits of a radio control unit in accordance with embodiments of the present disclosure.
Figure 8:
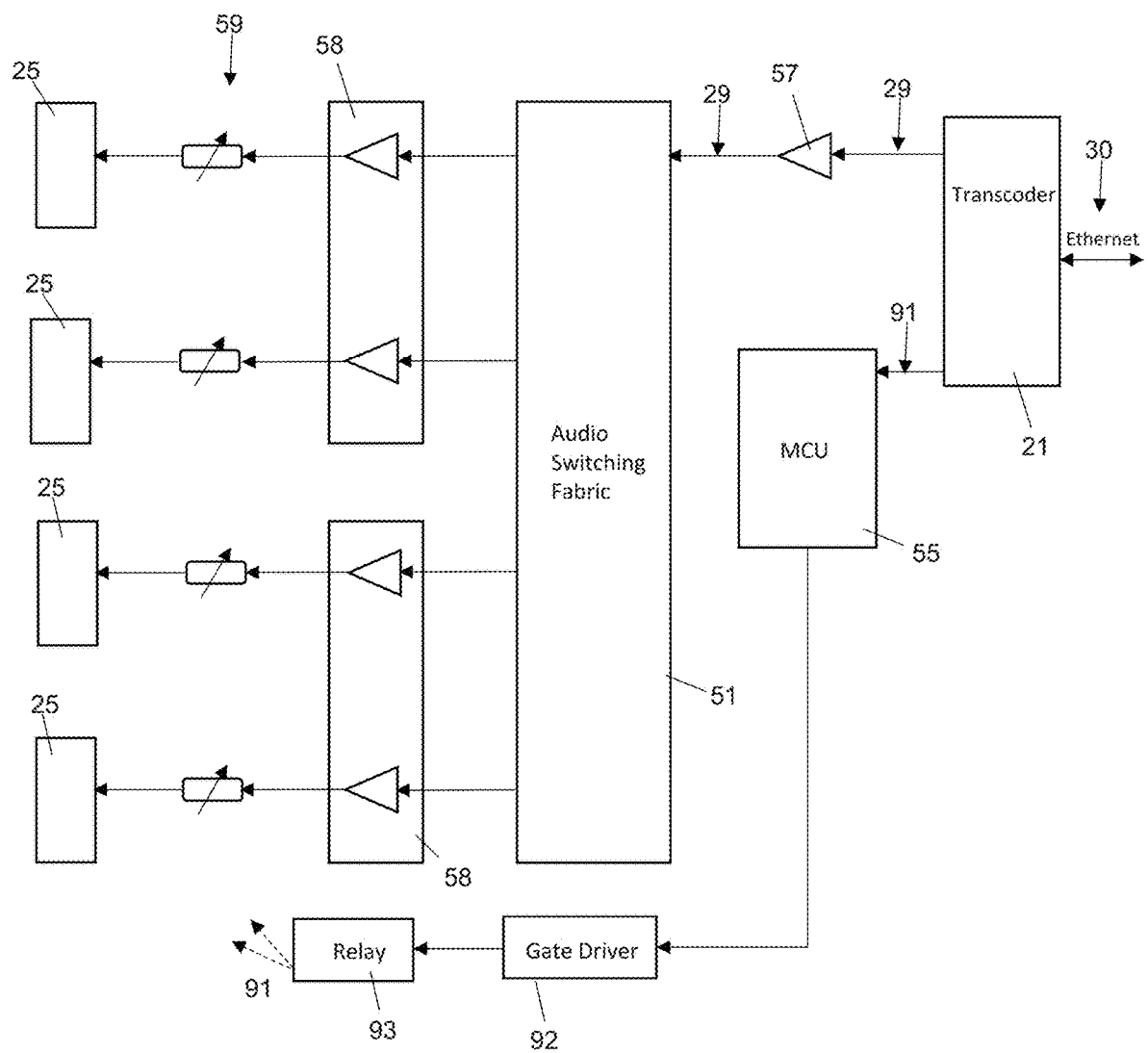
FIG. 8 shows an exemplary diagram of transmit audio circuits of a radio control unit in accordance with embodiments of the present disclosure.

As further shown in FIGS. 1 and 2, four radio connectors 26 are shown on the RCU 14 for permitting audio cabling connection between the RCU 14 and up to four radios 25. As shown in FIGS. 5, 8 and 9, various components can be found within the rugged casing 15 of the RCU 14. These components include transcoder 21, a circuit board 23 containing an RCU microcontroller 55, audio interfacing components, audio and push-to-talk routing components and voltage regulators, for example, and a PoE inserter 27.

Figure 3:
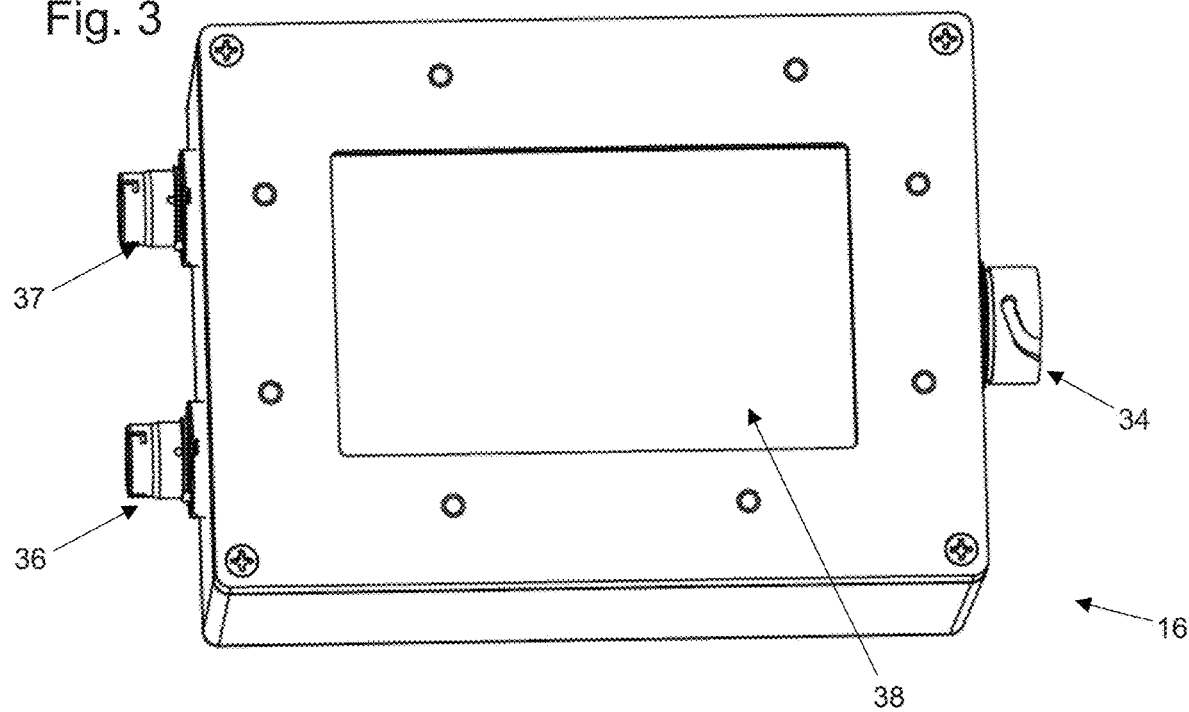
FIG. 3 is a top perspective view of an embodiment of an operator control panel portion of an ADM in accordance with embodiments of the present disclosure.
Figure 4:
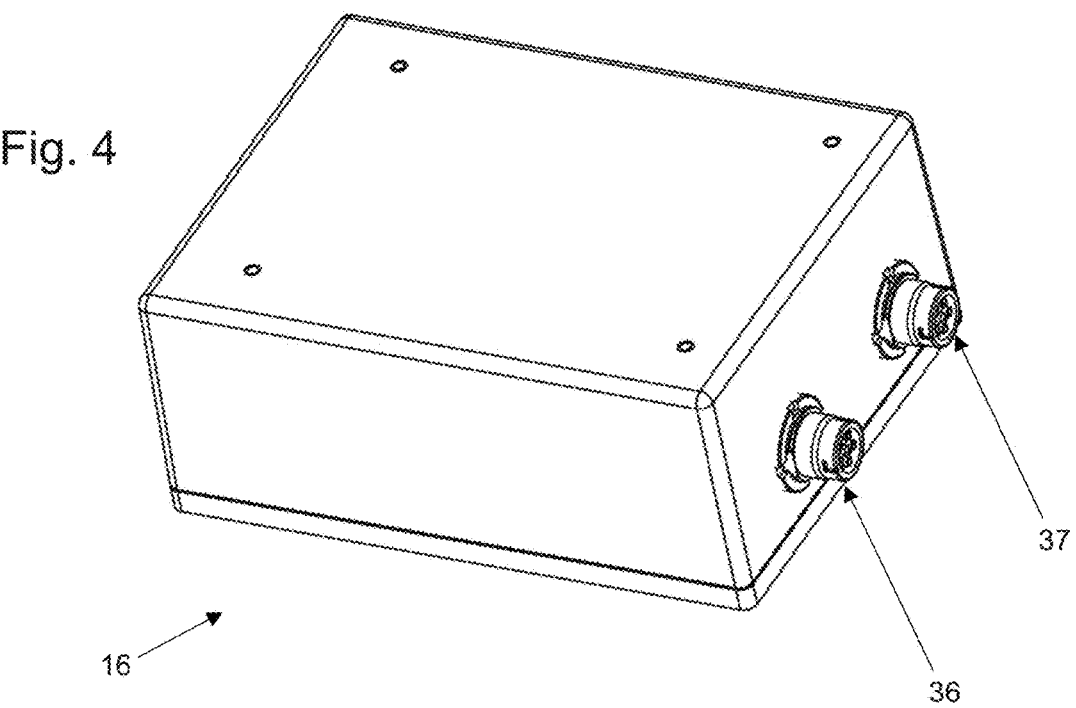
FIG. 4 is a bottom perspective view of the embodiment of the operator control portion of FIG. 3.

As shown in FIGS. 1, 3 and 4, in various embodiments, the ADM 12 provides audio connectors 36, 37 on the OCP 16 for up to two ear/PTT interfaces on a single headset 40. Each connector 36, 37 can be a SupplyNet™ P/N U-283/U or equivalent plug. Alternatively, two operators could each plug a single ear/PTT interfaces from each of two headsets 40 into the plugs 36, 37. The graphical user interface (GUI) 38 can be embodied in the form of a touchscreen interface according to various embodiments of the present disclosure. As shown in FIG. 9, various components can be found within the casing 15 of the OCP 16, including a transcoder 60, a circuit board 75 containing an OCP microcontroller 68, audio interfacing components, routing components and voltage regulators, for example, and a PoE adapter 63.

It will be appreciated that the arrangement of connectors 22, 24, 26 on the RCU 14 and connectors 34, 36, 37 on the OCP 16 optimizes routing of external cables between the ADM 12 and one or more radios 25, the ADM 12 and a headset 40, while promoting user accessibility to the human-system interfaces (e.g., GUI 38) when the ADM 12 rests on a horizontal work surface or integrates onto a vehicle dashboard assembly, for example.

In various embodiments, the ADM 12 provides audio connections for up to four radios 25. In other embodiments, more radios can be accommodated. Each connection 26 can be a SupplyNet™ P/N U-283/U or equivalent plug. These same plugs are commonly used on the radios 25 to which the ADM 12 interfaces, simplifying the cable interconnections between the radios 25 and the ADM 12.

FIG. 5 shows exemplary receive audio circuits of the RCU 14 in accordance with embodiments of the present disclosure. The RCU's audio routing matrix or audio switching fabric 51 amplifies, filters, and directs the audio received from each of up to four radios 25 to one or both channels 29A, 29B of an audio transcoder 21. This transcoder 21 digitizes the analog audio on the two channels 29A, 29B. The operator of the ADM 12 determines how audio from the radios 25 routes over which of the two channels 29A, 29B using selector switches represented by the OCP's GUI 38. With reference to FIGS. 5 and 9, in various embodiments, the transcoder 21 routes the now-digitized receive audio to the OCP 16 over the same IEEE 802.3af-compliant Ethernet connection 30 used to distribute power to the OCP 16. Using Ethernet in this way eliminates cabling infrastructure required to employ the ADM 12. In various embodiments, the transcoder 21 uses serial transistor-transistor logic (serial TTL) to communicate to the RCU microcontroller 55, which communicates back to the audio switching fabric 51.

Figure 6:
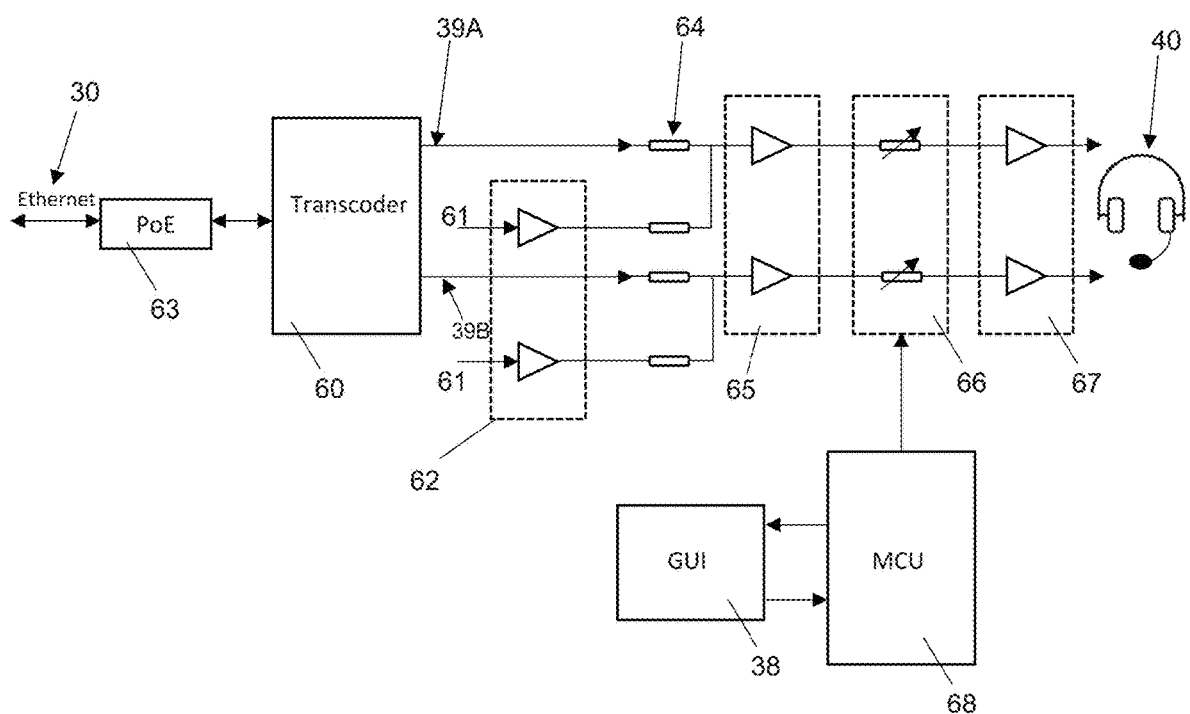
FIG. 6 shows an exemplary diagram of receive audio circuits of an operator control panel in accordance with embodiments of the present disclosure.

FIG. 6 shows an exemplary diagram of receive audio circuits of the OCP 16 in accordance with embodiments of the present disclosure. The OCP's audio transcoder 60 receives audio over Ethernet 30 from the RCU 14 via PoE adapter 63 and directs it over audio channels 39A, 39B corresponding to the same two audio channels 29A, 29B as determined in the RCU 14. These channels 39A, 39B may optionally route through resistors 64, amplification 65 and filter circuits, digital-to-analog conversion circuits, attenuators 66 such as may be employed through the microcontroller 68 via the GUI 38 for volume control, and headset amps 67, to the operator headset 40. Sidetone is optionally available as indicated at 61, selectable by the operator via a button in the GUI 38 and routed through amplification circuits indicated at 62. From the operator's perspective, he or she selects in the GUI 38 which radio receive audio routes to which of the two headset channels 39A, 39B, as shown and described elsewhere herein. The audio circuits in FIGS. 5 and 6 combine to execute this selection. The microcontroller 68 of the OCP 16 processes communications and/or instructions from the GUI 38.

Figure 7:
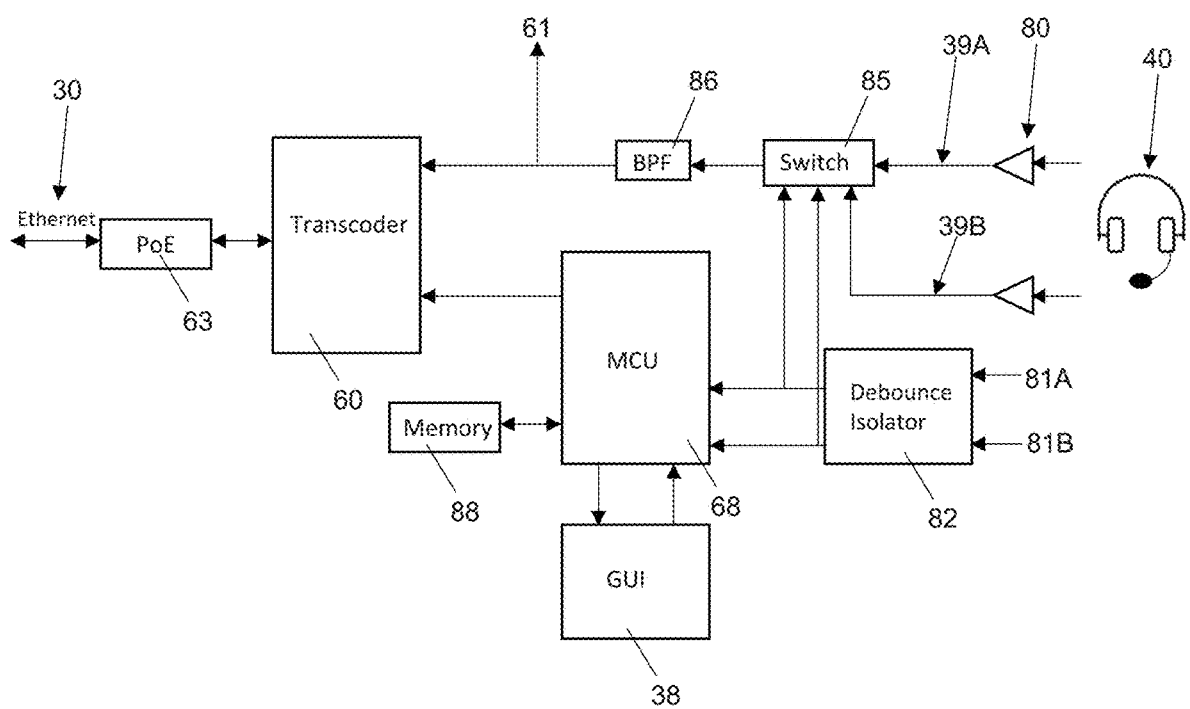
FIG. 7 shows exemplary transmit audio circuits of an operator control panel in accordance with embodiments of the present disclosure.

FIG. 7 shows exemplary transmit audio circuits of the OCP 16 in accordance with embodiments of the present disclosure. The OCP's circuitry amplifies, filters, and directs the audio transmitted from each of the headset channels 39A, 39B to the audio transcoder 60. Pre-amps 80 can be employed to amplify the sound input. The transcoder 60 digitizes the analog audio on the two channels 39A, 39B. The microcontroller 68 embedded in the OCP 16 also serializes the states of each of the headset's two Push-to-Talk (PTT) circuits 81A, 81B. A debouncing isolator 82 can be employed to provide a cleaner signal from the PTT circuits 81A, 81B before routing the signals to a switch 85. The switch 85 also receives signals from channels 39A, 39B and can route the resulting signal through band pass filter 86 for transmission to transcoder 60, with optional routing for sidetone 61. The transcoder 60 encodes the digital representation of headset PTT. The transcoder 60 routes the now-digitized transmit audio, and the encoded headset PTT states, to the RCU 14 over the same IEEE 802.3af-compliant Ethernet connection 30 used to distribute power to the OCP 16, and to route receive audio from the RCU 14 to the OCP 16. Using Ethernet in this way eliminates cabling infrastructure required to employ the ADM 12. In various embodiments, a memory 88 such as a flash memory can be employed to store a custom application running on the MCU 68. Memory 88 can also store one or more configurations of audio settings as selected by an operator. It will be appreciated that memory 88 can be provided as non-volatile, so it retains configuration settings even after power-cycling, allowing the operator to preferentially configure the audio routing once and operate that way for multiple missions over multiple deployments, for example.

FIG. 8 shows an exemplary diagram of transmit audio circuits of the RCU 14 in accordance with embodiments of the present disclosure. The RCU's audio transcoder 21 receives audio over Ethernet 30 from the OCP 16 and directs it over audio channel 29 corresponding to the same two audio channels 39A, 39B as determined in the OCP 16. This channel 29 routes through the audio switching fabric 51, amplification (e.g., 57, 58), filter, and attenuation (e.g., 59) circuits, and digital-to-analog conversion circuits, to up to four radios 25 in this embodiment. The transcoder 21 also decodes the headset PTT states 91 and routes these to the radios 25, depending upon the how the operator selected their paths in the OCP's GUI 38. The MCU 55 receives the PTT selection states 91 from the transcoder 21 and routes the corresponding TTL signal through a gate driver 92 and Form C relay array 93, to the appropriate radio(s) 25 as indicated in dashed lines 91. It is the PTT state 91 that gates whether a radio routes the transmit audio presented to it. It will be appreciated that this approach simplifies the design of the transmit audio routing circuitry, increasing overall ADM reliability. From the operator's perspective, he or she selects in the GUI 38 which headset transmit audio and PTT state routes to which of the four radios 25.

FIG. 9 depicts how the ADM 12 includes an Ethernet connection 30 to connect the RCU 14 and the ODP 16 according to various embodiments of the present disclosure. In various embodiments, this connection 30 is a Category 5 or 6 twisted pair cable that provides a path for audio, control signals, and power to route between the RCU 14 and the OCP 16. Since the radios 25 connect to the RCU 14 of the ADM 12, and the headset 40 connects to the OCP 16 of the ADM 12, the radios 25 and the operator using the headset 40 can be separated a great distance, such as up to one hundred meters or more. This single interconnect facilitates installation of the ADM 12 into tactical vehicles and other deployable platforms while allowing physical separation of the radios from the operator. The single interconnect also minimizes cabling infrastructure needed in the vehicle or operating location. Beyond these applications, the ADM 12 enables IEEE 803.af-compliant signaling between the modules, promoting its integration into tactical operating centers (TOCs) over the site's existing networking infrastructure.

In various embodiments as illustrated in FIGS. 6 and 7, the ADM 12 applies an amplification and filtering circuit immediately upon the transmit and audio pins of each the radio and headset interface connectors to suppress noise that would interfere with the intelligibility of the audio to the operator. A certain community of end-users for the ADM 12 is highly attuned to the presence of noise on audio circuits. Such noise is not only distracting but can even corrupt the audible information transmitted or received through the ADM 12. Since the audible information can include high-tempo military operations such as directing air strikes or personnel recovery operations, any degradation in audio quality can have critical consequences. Thus, the audio filtering features of the ADM 12 are important to its purpose. The amplifier circuits ensure any degradation in the amplitude of the audio signals due to cable losses or filtering are compensated. The ADM 12 thus routes audio with no decay in quality or volume when compared to operating with a headset directly connected to a radio.

It will be appreciated that the audio relays, for both transmit and receive audio, are part of the switching fabric 51. In various embodiments, this switching fabric 51 is a core function of the ADM 12. For either transmit or receive audio, the fabric 51 lies between a pair of amplifier circuits (e.g., 57, 58). An exemplary diagram of receive audio relays is shown in FIG. 5, as described above. An exemplary transmit audio relay diagram is shown in FIG. 8, as described above.

As shown in FIGS. 10 through 14, the GUI 38 can provide different interfaces including a volume selector, a display dimmer selector and radio status selectors for each radio. A home screen interface 90 can show menu selection items for the Home screen as indicated at 100, a Volume interface as indicated at 110 and a Brightness interface as indicated at 120. The Home screen 100 can show the radio status selectors 102, 104, 106, 108 as indicated on display interface 150.

Figure 10:
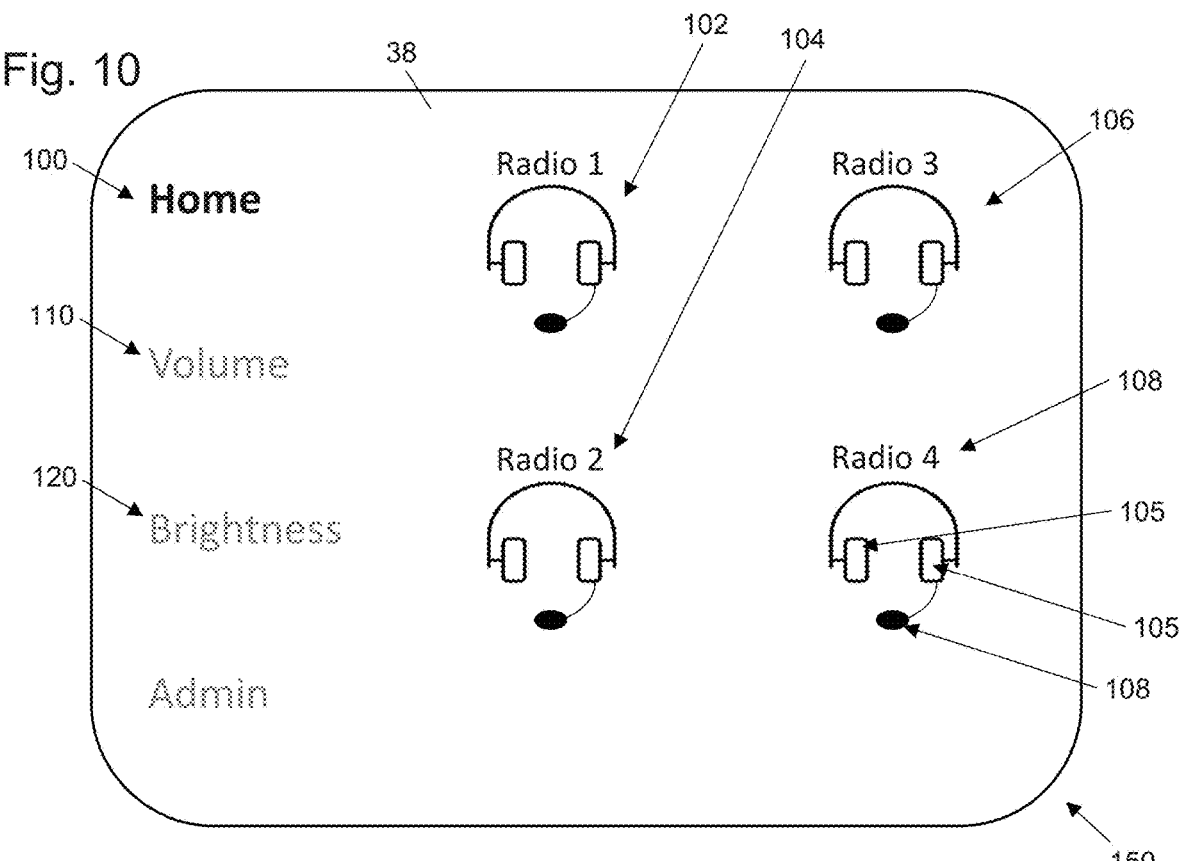
FIG. 10 is a schematic view of a Home screen display of an ADM in accordance with embodiments of the present disclosure.

The radio status selectors 102, 104, 106, 108 can be or include one or more selectable audio out icons and one or more selectable audio in icons. Audio out can refer to the ability for a radio to communicate audio out signals to the ADM 12 via a microphone, for example. Audio in can refer to the ability for a radio to receive audio in signals such as through speakers, for example. As shown in FIG. 10, the GUI 38 can include audio out icons (e.g., 103) that may appear as a microphone portion of a headset. As further shown in FIG. 10, the GUI 38 can include one or more audio in icons (e.g., 105) that may appear as ear pieces which can include speakers so the radio is enabled to hear incoming audio communications. In various embodiments, when the user touches the individual icons on the GUI 38, instructions are sent to invoke the selections made. For example, as shown in the example interface 170 of FIG. 13, the user may select to activate both audio in icons 155 of radio one, one audio in icon 156 of radio two, one audio in icon 157 of radio three, and the audio out icon 158 of radio one. In another embodiment as shown in the example interface 180 of FIG. 14, the operator may select to activate all audio in icons (e.g., 182) of all radios, and the audio out icons 184, 186 of radio one and radio four, respectively. The GUI-implemented icons and/or virtual switches thus enable the operator to independently route radio RX and TX audio to/from one or more radios 25 to either/both/none of the ear/mic connections of a dual comm headset. In various embodiments, as the user selects a transmit or receive audio circuit path using these switches, the switch virtually illuminates. This provides a visual cue to the operator of which radio audio streams route to which headset interface. The switch/indicator arrangement facilitates operator assessment of the audio routing status in an intuitive manner that requires little pre-training of or ongoing cognitive load on the user. The ADM 12 can accomplish the routing by employing an array of relays. The programmable microcontroller periodically reads each of the selector switch states and drives the state of corresponding relays. The microcontroller also drives the status indications implemented in the GUI 38.

Figure 11:
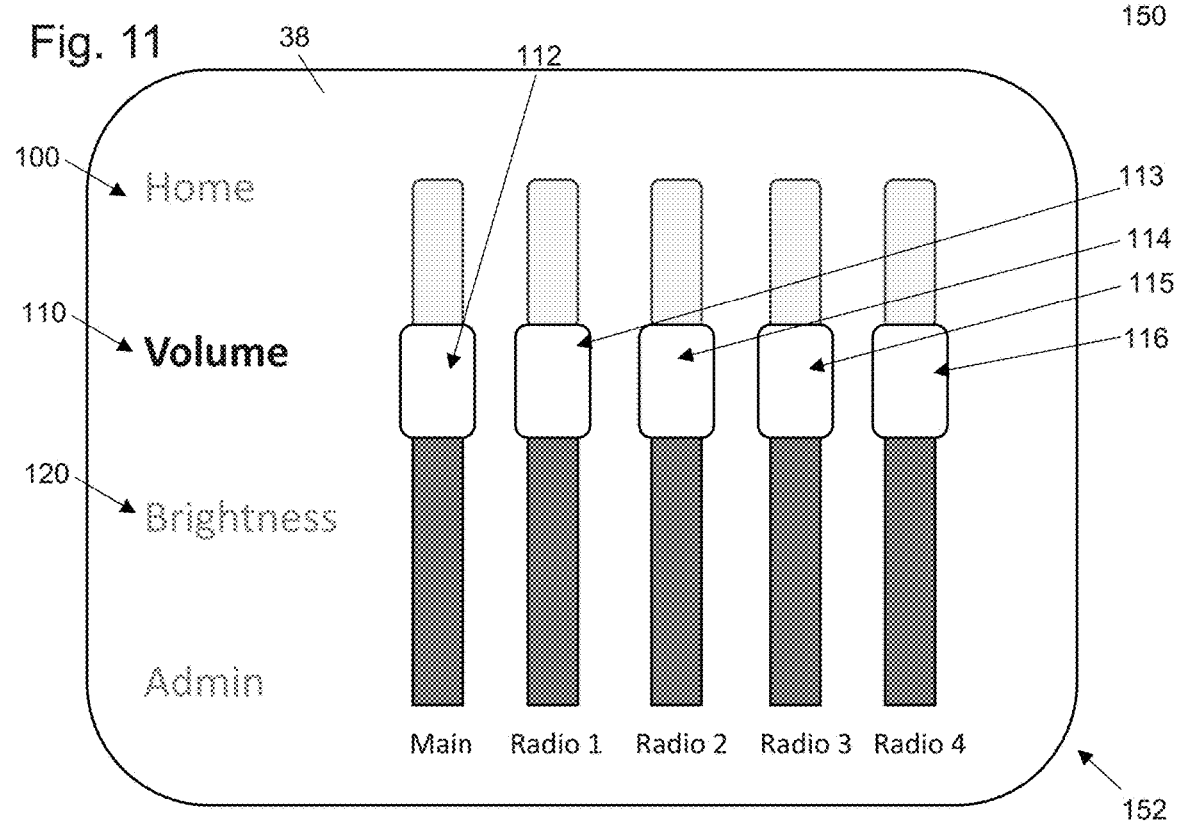
FIG. 11 is a schematic view of a Volume screen display in accordance with embodiments of the present disclosure.

In various embodiments, such as shown on display interface 152 of FIG. 11, the volume selector includes a master volume selector 112 for all radios. In other embodiments, the volume selector includes individual volume selectors 113, 114, 115, 116 for each radios. As shown in the embodiment of FIG. 11, the volume selector can include both a master volume selector 112 and individual volume selectors 113, 114, 115, 116. The master volume switch adjusts receive audio globally, for all audio circuits simultaneously. The individual volume switches adjust their respective circuit's volume up or down from the audio level set by the master volume control. This allows the user to set an overall volume, then trim the volume of each circuit as needed. Each of the switches can be provided as finely adjustable virtual switches implemented in the GUI 38, for example.

Figure 12:
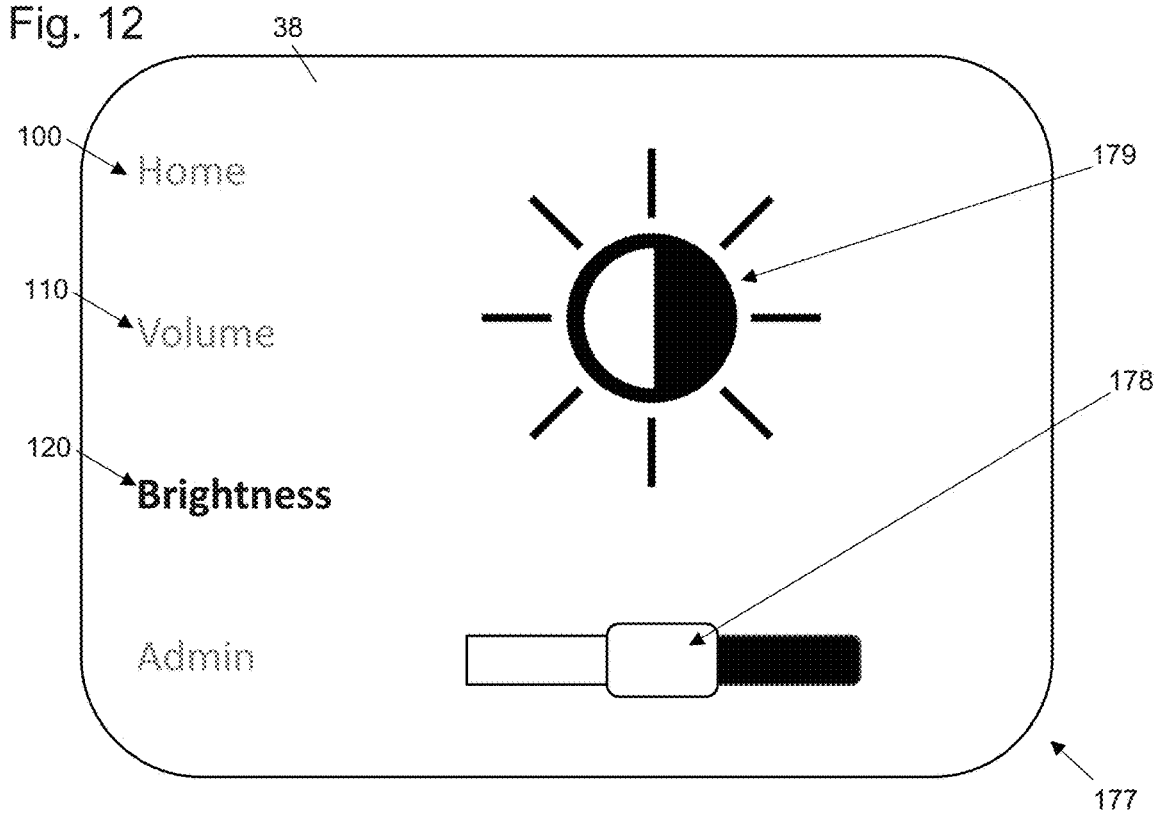
FIG. 12 is a schematic view of a Brightness screen display in accordance with embodiments of the present disclosure.
Figure 13:
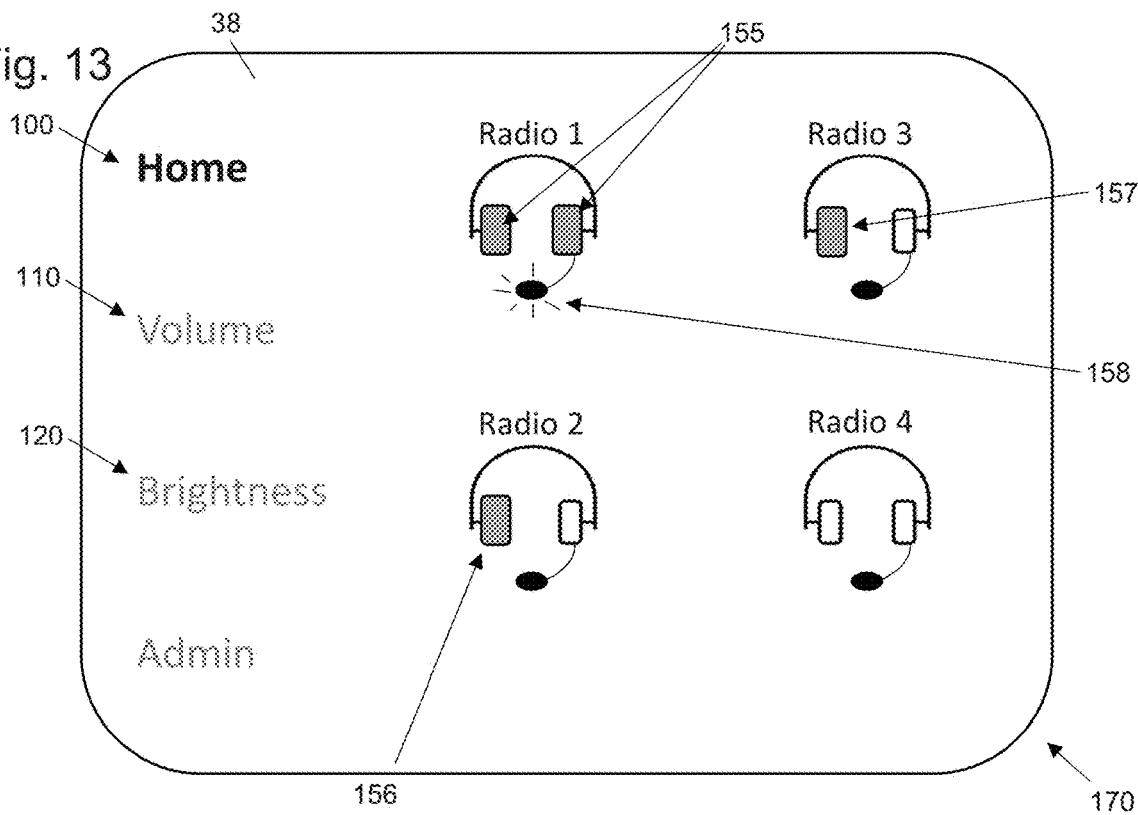

In various embodiments, such as shown on display interface 177 of FIG. 12, the brightness selector includes a brightness dimmer switch and/or selector icon 178 and a brightness indicator display 179. The virtual dimmer switch 178 allows the user to adjust the illumination intensity of the display. Various applications of the ADM may require the indicators to function in full sunlight conditions, in nighttime conditions with operators using night vision devices, and night-time with full black-out of all indicators. The dimmer icon 178 permits adjustment of the display intensity across the spectrum of these ambient external lighting extremes.

It will be appreciated that the ADM 12 thus can receive input via the GUI 38 requesting audio input to be transmitted from one or more of the radios 25 to the headset 40. In response to the input, the ADM 12 configures the RCU 14 and OCP 16 to enable the audio input to be transmitted from the selected radio(s) 25 to the headset 40, even fine tuning whether the audio input can be transmitted on one or both channels to the headset 40. The ADM 12 can later receive a different input via the GUI 38 requesting audio output be transmitted from the headset 40 to one or more of the selected radios 25. In response to the different input, the ADM 12 can configure the RCU 14 and OCP 16 to enable audio output to be transmitted from the headset 40 to the selected radio(s).

The headset 40 can include a first headset speaker (e.g., for a left ear of a user) and a second headset speaker (e.g., for a right ear of a user). Also, the GUI can permit a user to input a request for the audio input to be sent to the first headset speaker and not to the second headset speaker or vice versa. In response to the inputted request, the ADM 12 can enable audio input to be sent from one or more of the radios 25 to the headset speaker(s) of the headset 40.

In various embodiments, a user can employ the GUI 38 to direct that audio input from two radios 25 is to be routed over one or both channels of the audio transcoder 21 and/or 60. Further, the user can employ the GUI 38 to set a volume level for the audio input and/or audio output, as illustrated in FIG. 11 and described elsewhere herein. The volume level can be set as a master setting for all radios, or as individual settings for individual radios.

The audio switching fabric 51 can include audio relays for directing the transmission and receipt of audio content between the headset 40 in communication with the OCP 16 and the radios 25 in communication with the RCU 14. The audio switching fabric 51 can employ the microcontroller 55 to periodically read a state of a status selector (e.g., 102, 104, 106 and/or 108), wherein the status selector is adjustable via the GUI 38 of the OCP 16. The microcontroller 55 can drive a state of the audio relays corresponding to the status selector based upon its status as adjusted by the user.

As will be appreciated, according to various embodiments, the OCP microcontroller 68 is a programmable device that periodically reads the state of the GUI-based selector switches (e.g., 102, 104, 106, 108), volume switches (e.g., 112, 113, 114, 115, 116), and dimmer switch (178) and drives the state of the audio relays and the status indications accordingly. The microcontroller 68 can interface to the audio relay and circuits for the selector switches via an I2C bus, for example. The bus pushes serial data to general purpose input/output (GPIO) components that interface directly to the relays and switches. The bus can also communicate serially over the I2C bus with an LED controller, which interfaces directly to the indicators. The microcontroller 68 also reads the PTT state of each of the two headset interfaces and drives a PTT signal to the appropriate radio 25, as determined by the state of the selector switches. In various embodiments, the microcontroller 68 saves the last known state of the selector switches and status indications via writing to/reading from the memory 88 and can boot back into that same state if and when the module power cycles.

In various embodiments, a USB interface permits initial programming of the microcontroller 68 from a standard computing device. It also serves as a factory-maintenance interface to facilitate status assessment during troubleshooting and, if necessary, re-programming or upgrading the microcontroller 68. According to various embodiments, the ADM 12 can accept +10 VDC to +30 VDC in, and distributes it to onboard +12 VDC, −5 VDC, and +5 VDC regulators. These regulators then provide clean DC power to the various components onboard the RCU 14 and OCM 16 of the ADM 12, most notably, the microcontroller(s), audio amplifiers, switch, touchscreen, and relays. The +10 to +30 VDC input facilitates the ADM 12 operating with military radio batteries when supporting dismounted missions, and with vehicle power when supporting vehicular-mounted missions.

In various embodiments, the ADM 12 accommodates a range of man-pack and vehicular-mounted radios commonly used by an exemplary intended user community. In specific embodiments, the ADM will operate appropriately given the paired radios meet these specifications.

Rx audio maxes at $3.87V_{RMS}$ into a 1 kΩ load, and 3 W maximum into an 8Ω load Tx audio maxes at $1.5V_{RMS}$, with a $Z_{IN}=150Ω$.

It will be appreciated that the ADM 12 is modular in many ways, facilitating ready expansion of the number of radios it supports and extending the range of types of audio interfaces. The modular design of the ADM 12 facilitates adding additional filter boards, amplifier circuits, I2C bus-connected GPIO components, relays in the switching fabric, and selector switches to expand beyond four radios in different embodiments. The amplifier circuits offer a wide-ranging exponential control of gain and attenuation, with low signal distortion, to readily interoperate with a variety of radios. The microcontroller instructions can readily expand to accommodate more operating scenarios, including boot-up states, status reporting, and operator-initiated "soft" resets, for example. The microcontroller can accommodate changes to the GUI, adapting the controls and display language to a range of different user applications.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon. Embodiments of a system as described herein can include a headset, the ADM and/or one or more radios.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors such as the microcontroller which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., microcontroller) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages.

The present disclosure contemplates a variety of different systems each having one or more of a plurality of different features, attributes, or characteristics. A "system" as used herein can refer to various configurations of: one or more ADMs; one or more ADMS in communication with one or more radios and/or one or more headsets; and one or more computing devices in communication with an ADM. Many of the tasks, such as configuring a microcontroller, may be performed with personal computing devices.

In certain embodiments in which the system includes a computing device in combination with an ADM, the ADM includes any suitable circuit board that has at least one microcontroller and at least one memory device or data storage device. Suitable instructions stored in memory permit the microcontroller(s) to transmit and receive data or signals representing events, messages, commands, or any other suitable information necessary or desirable to effect the functions as described herein. The microcontroller(s) is/are configured to execute the events, messages, or commands represented by such data or signals in conjunction with the operations as described herein.

The invention claimed is:

1. An audio distribution system, comprising:
a radio control unit;
an operator control panel in communication with the radio control unit, wherein the operator control panel comprises a graphical user interface;
a headset communicably connected to the operator control panel;
a first radio and a second radio communicably connected to the radio control unit; and
a microcontroller and a memory storing instructions that, when executed by the microcontroller, cause the microcontroller to:
receive first input via the graphical user interface requesting audio input to be transmitted from the first radio to the headset;
in response to the first input, configure the radio control unit and operator control panel to enable audio input to be transmitted from the first radio to the headset;
receive second input via the graphical user interface requesting audio output to be transmitted from the headset to the second radio, wherein the second input further requests audio output to be transmitted from the headset to the first radio and wherein, in response to the second input, the instructions further cause the microcontroller to configure the radio control unit and operator control panel to enable audio output to be transmitted from the headset to the first radio; and
in response to the second input, configure the radio control unit and operator control panel to enable audio output to be transmitted from the headset to the second radio.

2. The audio distribution system of claim 1, wherein the headset comprises a first headset speaker and a second headset speaker, wherein the received first input requests the audio input to be transmitted to the first headset speaker and not to the second headset speaker, and wherein, in response to the first input, the instructions cause the microcontroller to enable audio input to be transmitted from the first radio to the first headset speaker of the headset.

3. The audio distribution system of claim 1, wherein the operator control panel comprises an audio transcoder comprising two channels.

4. The audio distribution system of claim 3, wherein the instructions further cause the microcontroller to receive a third input instructing audio input from the first and second radios to be routed over one or both of the two channels of the audio transcoder.

5. The audio distribution system of claim 1, wherein the instructions further cause the microcontroller to receive a third input from the graphical user interface instructing a volume level for the audio input and the audio output.

6. The audio distribution system of claim 1, wherein the radio control unit comprises a power input receiver.

7. The audio distribution system of claim 1, wherein the operator control panel is in communication with the radio control unit via a power-over-Ethernet (PoE) connection.

8. The audio distribution system of claim 1, wherein the graphical user interface comprises a touch screen display comprising a volume selector, a first radio status selector, a second radio status selector and a display dimmer selector.

9. The audio distribution system of claim 8, wherein the first radio status selector comprises a selectable audio out icon and a selectable audio in icon, and wherein the first input received via the graphical user interface comprises a touch selection of the audio out icon.

10. The audio distribution system of claim 8, wherein the second radio status selector comprises a selectable audio out icon and a selectable audio in icon, and wherein the second input received via the graphical user interface comprises a touch selection of the audio in icon.

11. The audio distribution system of claim 1, wherein the radio control unit comprises a radio control unit amplifier and a radio control unit filter, and wherein the operator control panel comprises an operator control panel amplifier and an operator control panel filter.

12. The audio distribution system of claim 1, wherein the radio control unit is physically separated from the operator control panel.

\* \* \* \* \*